United States Patent [19]
Lewis

[11] 4,002,825
[45] Jan. 11, 1977

[54] SYSTEM FOR ENCODING AND DECODING AMPLITUDE MODULATED SIGNALS

[75] Inventor: Donald W. Lewis, Stanton, Calif.

[73] Assignee: Summit Systems, Inc., Placentia, Calif.

[22] Filed: July 25, 1973

[21] Appl. No.: 382,574

[52] U.S. Cl. .............................. 325/32; 329/123; 331/18; 358/123

[51] Int. Cl.² .................................... H04N 1/44

[58] Field of Search .................. 178/5.1, DIG. 13; 325/32, 60, 65, 138, 308, 419; 329/122, 123; 331/18

[56] References Cited
UNITED STATES PATENTS

| 3,084,329 | 4/1963 | Clay | 325/60 |
| 3,353,099 | 11/1967 | Hayasi et al. | 325/60 |
| 3,508,154 | 4/1970 | Kermode | 325/60 |

Primary Examiner—Maynard R. Wilbur
Assistant Examiner—S. C. Buczinski
Attorney, Agent, or Firm—Philip M. Hinderstein

[57] ABSTRACT

A system for encoding or scrambling an amplitude modulated signal, such as the video component of a standard television signal, and for subsequently decoding or unscrambling the signal so as to restore the original message content. Encoding is achieved by shifting the phase of the carrier component relative to the phase of the side-bands by an amount sufficient to significantly distort the modulation envelope. Decoding is achieved by summing the received signal with a corrective signal having a frequency, amplitude, and phase which effectively cancels the phase-shifted carrier component and substitutes therefor a carrier component of phase and amplitude which will render intelligible the modulation envelope.

4 Claims, 3 Drawing Figures

SYSTEM FOR ENCODING AND DECODING AMPLITUDE MODULATED SIGNALS

BACKGROUND OF THE INVENTION

1. Field of the Invention

The present invention relates to a system for encoding and decoding amplitude modulated signals and, more particularly, to a system for scrambling or encoding transmitted video signals so that the received video display is severely distorted and for unscrambling or decoding the received signal to permit a normal video display.

2. Description of the Prior Art

In the rapidly expanding field of pay cable television, it is common to transmit a number of television programs on frequency channels within the VHF spectrum but which do not coincide with any of the normal channels 2 through 13 of a standard television receiver. Thus, in order for a subscriber to the cable television service to receive these television programs, he is provided with a converter which will convert the frequency channels to one of the normal channels of the television receiver. Typically, such converter is a conventional superhetrodyne tuner including a local oscillator and a mixer, the latter mixing the frequency of the local oscillator with the incoming frequency to convert it to one of the available, but unused channels of the television receiver.

Obviously, the intent of such a system is that only those individuals who subscribe to the cable television service shall have access to a converter which will permit reception of these television programs on a standard TV set. However, because of the relative ease in building a superhetrodyne tuner, which only requires a local oscillator and mixer, a number of converters have been made generally available or have been made individually. Thus, many individuals who have not paid for the service nevertheless have the service provided to them.

In order to overcome this problem, it has been proposed to alter the transmitted signal in a manner which would prevent or severely distort a normal video picture even if the frequency channel was converted to one of the normal channels of the television receiver. Such altering of the transmitted signal is often referred to as scrambling or encoding. Therefore, in addition to requiring a converter, the individual must have suitable apparatus to unscramble or decode the received signal if he is to receive an intelligible video picture.

With this in mind, numerous attempts have been made to provide encoding/decoding systems for cable television systems. However, to date, none of the suggested systems have been acceptable for a variety of reasons. Some proposed systems have required a significant increase in the bandwidth of the transmitted signal and this is generally unacceptable because of the limitation that it places on the number of available channels. Other systems have been highly complex and therefore expensive, making them impractical for a wide-spread cable television system. Still other systems, while working adequately with older, less sophisticated television receivers, do not work effectively with the newer, more sophisticated television sets which tend to be less susceptible to slight or minor distortions of an incoming video signal.

SUMMARY OF THE INVENTION

According to the present invention, there is provided a system for encoding or scrambling and subsequently decoding or unscrambling an amplitude modulated signal of the type encountered in television systems which solves the problems encountered heretofore. In the first instance, the present system requires no increase in the normal bandwidth of transmission channels. Secondly, the present system is relatively simple and can be manufactured and sold at an extremely low cost, one which is compatible with wide scale cable television systems. Finally, in spite of being relatively simple and inexpensive, the present system is highly effective, even with the most modern, sophisticated television receivers.

Briefly, the present system for encoding and decoding an amplitude modulated signal having a carrier component and at least one set of side-bands comprises means for shifting the phase of the carrier component relative to the phase of the side-bands by an amount sufficient to significantly distort the modulation envelope, means for transmitting the phase-shifted carrier component and the set of side-bands, means for receiving the transmitted signal, and means for summing the received signal with a corrective signal having a frequency, amplitude, and phase which effectively cancels the phase-shifted carrier component and substitutes therefor a carrier component of phase and amplitude which will render intelligible the modulation envelope.

OBJECTS

It is therefore an object of the present invention to provide a system for encoding and decoding amplitude modulated signals.

It is a further object of the present invention to provide a system for scrambling or encoding transmitted video signals so that the received video display is severely distorted and for unscrambling or decoding such signals to permit a normal video display.

It is a still further object of the present invention to provide a system for encoding and decoding amplitude modulated signals which requires no increase in bandwidth.

It is another object of the present invention to provide a system for encoding and decoding amplitude modulated signals which is simple and inexpensive.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

One of the essential properties of an amplitude modulated signal is the symmetrical distribution of the side-band spectral terms about the carrier, with the message content of the modulated signal being carried in the phase and amplitude relationship of the various frequency components of the signal. In the case of simple sinusoidal amplitude modulation, the process can be described in accordance with the equation:

$$e = A\cos(\omega t + \alpha) + B\cos[(\omega+\nu)t + \beta] + C\cos[(\omega-\nu)t - \gamma],$$

where $\omega = 2\pi f_1$,
$\nu = 2\pi f_2$,
$f_1$ = the carrier frequency,
$f_2$ = the modulating frequency,
$\alpha,\beta,\gamma$ = the phase angles of the various frequency components, and
A,B,C = the magnitude of the various components.

If the phase angle of any of the components is displaced an appreciable amount, the modulation envelope will change shape and become distorted. Any amplitude modulation receiver using an envelope detection method will, therefore, provide a recovered message signal which is severely distorted.

The video component of a standard television signal is an amplitude modulated signal of this type. In the case of the video component of a television signal, the lower side-band spectral terms are suppressed, but the message content of the transmitted signal is carried in the phase and amplitude relationship of the carrier component and the upper side-band spectral terms. In addition, essentially all standard television receivers use an envelope detection method to extract the modulation information from the received signal. Thus, in the case of the video component of a standard television signal, if the phase of the carrier component is shifted relative to the phase of the side-band spectral terms by an appreciable amount such that the resulting distortion of the modulation envelope will make an envelope detected signal unintelligible, the received signal will be of no value to the recipient even if converted to the proper frequency channel.

Figure 1:
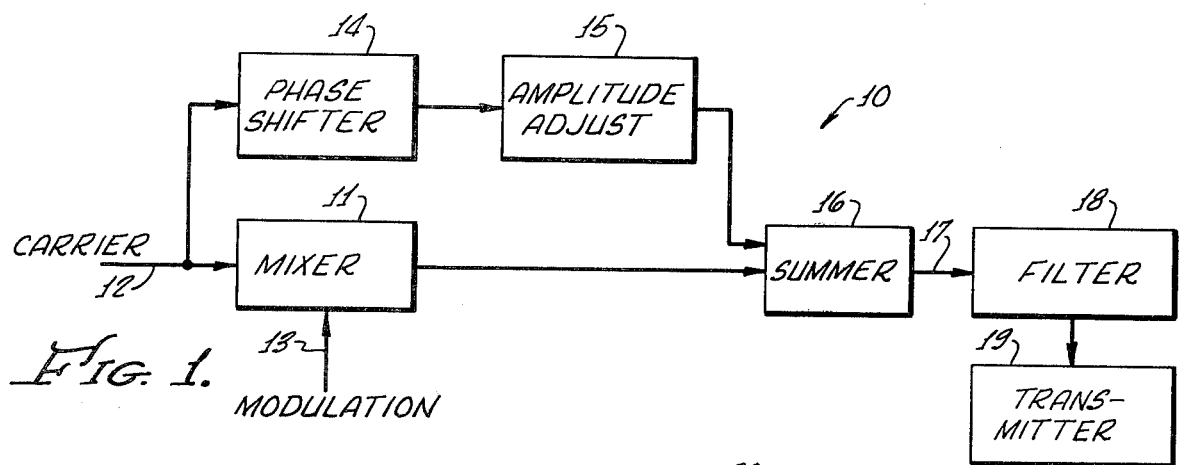
FIG. 1 is a block diagram of a system for encoding an amplitude modulated signal in accordance with the teachings of the present invention.

Referring now to the drawings and, more particularly, to FIG. 1 thereof, there is shown a first embodiment of apparatus, generally designated 10, for encoding an amplitude modulated signal such that the carrier component is shifted in phase relative to the phase of the side-bands. Encoder 10 includes a mixer 11 having first and second inputs which receive the carrier and the modulating signal on lines 12 and 13, respectively. The carrier signal on line 12 is also applied to a phase shifter 14, the output of which is applied to a circuit 15 for adjusting the amplitude of the phase-shifted carrier from circuit 14. The output of amplitude adjust circuit 15 and mixer 11 are applied to a summing circuit 16 which adds the two signals to provide an output on a line 17. The output on line 17 is directed via a filter 18 to a transmitter 19 where the filtered output of summer 16 is transmitted in the same manner as a standard television signal, either over the air or over a cable.

In operation, mixer 11 provides, at one input to summer 16, the carrier component together with the upper and lower modulation side-bands. However, in accordance with a preferred embodiment of the invention, mixer 11 is a double balanced mixer which suppresses the carrier frequency, providing at its output only the upper and lower modulation side-bands. In any event, the upper and lower modulating side-bands, with or without the carrier signal, are applied to a first input to summer 16.

The carrier component on line 12 is diverted around mixer 11, to phase shifter 14, where the phase thereof is shifted by a significant amount. The actual amount of phase shift provided by phase shifter 14 is insignificant, as long as it is substantial, and is determined by numerous considerations. For example, with a phase shift of as little as 30°, a received picture is so undesirable that it is generally considered to be unwatchable. In some cases, a 90° phase shift would be desirable or a 180° phase shift would also be convenient. In any event, it is the teaching of the present invention that phase shifter 14 shifts the phase of the carrier component relative to the phase of the side-bands by an amount sufficient to significantly distort the modulation envelope.

The output of phase shifter 14 is applied to the other input of summer 16 via amplitude adjust circuit 15. If mixer 11 is a double balanced mixer, so that the carrier frequency is suppressed, amplitude adjust circuit 15 is unnecessary in that essentially the only carrier component will be that provided by phase shifter 14. On the other hand, if the output of mixer 11 includes a carrier component, it would be necessary to increase the amplitude of the phase-shifted carrier component so as to cancel the unphase-shifted carrier component at the output of mixer 11 and substitute therefor a new, phase-shifted carrier component of equal amplitude. In either event, summer 16 adds the output of circuit 15 with the output of mixer 11 to provide, on line 17, the upper and lower sets of side-bands together with a carrier component having the desired amplitude and phase shift.

In the case of a television picture signal, the combined side-bands and phase-shifted carrier component are passed through filter 18 which is a vestigial side-band filter which suppresses the lower side-band. The phase-shifted carrier and the upper set of side-bands are then conducted to transmitter 19 for transmission.

Figure 2:
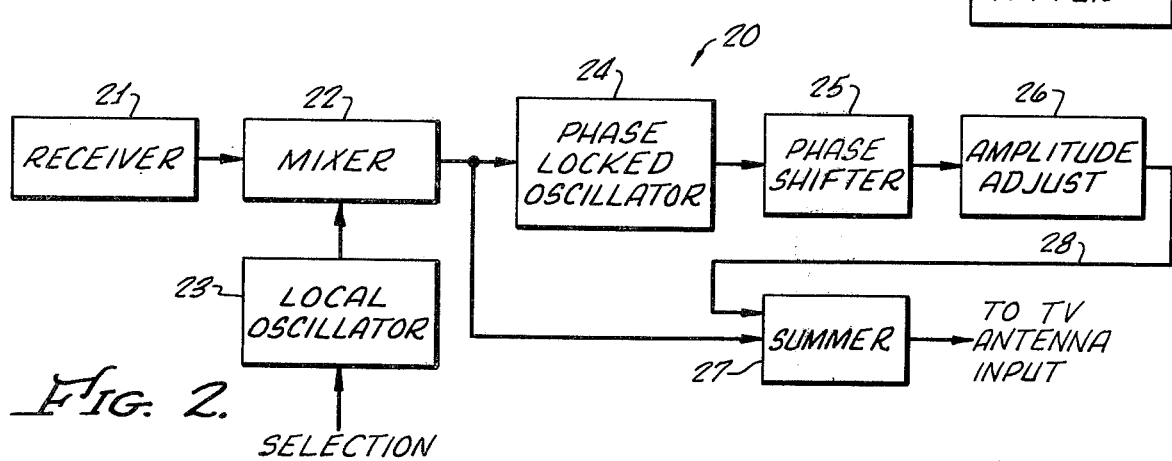
FIG. 2 is a block diagram of a first embodiment of system for decoding an amplitude modulated signal which has been encoded by the encoder of FIG. 1.

Referring now to FIG. 2, there is shown a first embodiment of apparatus, generally designated 20, for decoding or unscrambling a signal of the type transmitted by encoder 10 and for providing to the normal antenna input of a conventional television receiver an unscrambled signal suitable for viewing. Decoder 20 includes a receiver 21 which would receive the signal from transmitter 19 either over the air or over a cable. In order to show a complete embodiment, decoder 20 includes a mixer 22 having first and second inputs which are connected to the output of receiver 21 and the output of a local oscillator 23. The output of mixer 22 is applied to a phase-locked oscillator 24 so as to phase synchronize the output of oscillator 24 with the phase of the carrier component at the output of mixer 22. The output of oscillator 24 is applied via a phase shifter 25 and amplitude adjust circuit 26 to the first input of a summer 27 which also receives, at its second input, the output of mixer 22.

In operation, the output of receiver 21 is the phase-shifted carrier and the set of side-bands which appear at the output of transmitter 19. Since the carrier frequency would normally be different from any frequency to which a normal television receiver could be tuned, decoder 20 includes local oscillator 23 and mixer 22 arranged in conventional fashion so that the output of mixer 22 is at one of the normal channels of a standard television receiver. Local oscillator 23 would typically have a series of frequencies so that the subscriber would be able to select any one of several TV programs. In any event, the output of mixer 22 is applied via summer 27 to the normal antenna input of a television receiver. Since the frequency of the carrier component has now been converted to a standard channel, the message content is displayed on the picture tube. However, because of the phase shift of the carrier component, the picture is sufficiently distorted as to be unwatchable.

To restore the phase of the carrier, the output of mixer 22 is used to phase synchronize the output of oscillator 24 to that of the received signal. The recovered carrier component is now shifted in phase and adjusted in amplitude by circuits 25 and 26 so as to create a corrective signal on line 28, having a frequency, amplitude, and phase such that when added vectorially to the incoming carrier component and side-bands in summer 27, the proper amplitude and phase of the carrier component will be restored so as to render intelligible the modulation envelope. In other words, the amplitude and phase of the carrier component on line 28 is capable of effectively canceling the phase-shifted carrier component at the output of mixer 22 and to substitute therefor a carrier component of phase and amplitude which will render intelligible the modulation envelope.

The correct phase and amplitude of the output of amplitude adjust circuit 26 on line 28 is a matter of vector addition. In other words, the proper amplitude and phase of the corrective signal on line 28 is the vector sum of a first signal having the desired amplitude and phase and a second signal having an amplitude equal to the amplitude of the phase-shifted carrier component and a phase which is 180° out of phase with that of the phase-shifted carrier component. Thus, for example, if phase shifter 14 shifts the phase of the carrier component by 180°, the effective phase shift of phase locked oscillator 24 and phase shifter 25 will also be 180° and amplitude adjust circuit 26 will increase by a factor of two the amplitude of the carrier component. As another example, if phase shifter 14 shifts the phase of the carrier component by +90°, the corrective signal on line 28, resulting from the combined action of phase locked oscillator 24, phase shifter 25, and amplitude adjust circuit 26, will be the vector sum of a first signal having an amplitude A and a phase angle of 0° and a second signal having an amplitude A and a phase angle of −90°, where A is the desired amplitude of the carrier component. The resultant corrective signal has an amplitude 1.414A and a phase angle of −45°. In any event, the output of summer 27 is a reconstructed carrier of the proper amplitude and phase together with the set of side-bands so that the modulation envelope is undistorted and the received signal intelligible.

Figure 3:
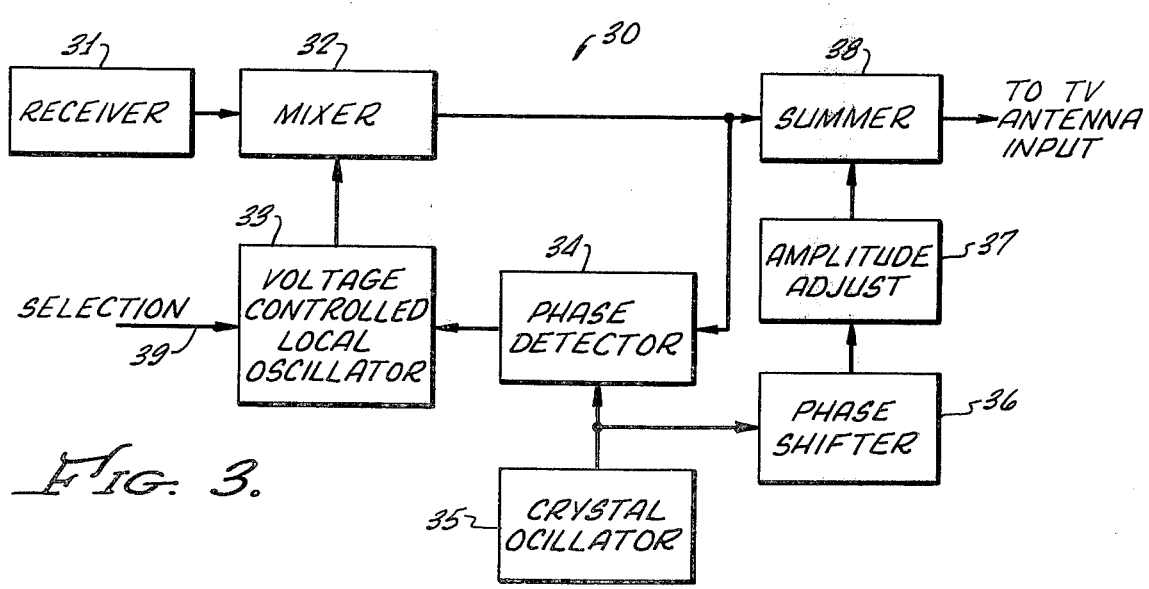
FIG. 3 is a block diagram of a second embodiment of system for decoding an amplitude modulated signal which has been encoded by the encoder of FIG. 1.

Referring now to FIG. 3, there is shown an alternate embodiment of apparatus, generally designated 30, for decoding or unscrambling an amplitude modulated signal which has been encoded by encoder 10. Decoder 30 is similar to decoder 20 in that the received signal is added to a corrective signal having a frequency, amplitude, and phase which effectively cancels the phase-shifted carrier component and substitutes therefor a carrier component of phase and amplitude which will render intelligible an envelope detected signal. On the other hand, detector 30 achieves such decoding with the additional benefit of automatic frequency control. In other words, drifting of the frequency of local oscillator 23 in decoder 20 may cause difficulties in tuning decoder 20 if frequency control circuitry is not included. This is avoided with decoder 30.

With reference to FIG. 3, decoder 30 includes a receiver 31, the output of which is applied to a first input of a mixer 32. The other input of mixer 32 is received from a voltage controlled local oscillator 33 which provides a signal having a frequency and phase controlled by the output of a phase detector 34. Phase detector 34 receives a first input from the output of mixer 32 and a second input from a crystal oscillator 35 and provides an output voltage which is a function of the phase difference therebetween.

Decoder 30 also includes a phase shifter 36 which receives the output of crystal oscillator 35, the output of phase shifter 36 being coupled via an amplitude adjust circuit 37 to a first input of a summer 38 which receives, at its second input, the output of mixer 32. The output of summer 38 is applied to the standard TV antenna input of a conventional television receiver.

In operation, receiver 31 receives the encoded output of transmitter 19 and applies the phase-shifted carrier component and the set of side-bands to a first input of mixer 32. Mixer 32 and local oscillator 33 are operative to select and convert the incoming signal to a frequency that is compatible with one of the available channels of a conventional television receiver. Course tuning of oscillator 33 is achieved by means of a suitable manual switch which applies a signal over a line 39 to oscillator 33.

The approximately correct frequency output of mixer 32 is then compared in phase detector 34 with the output of crystal oscillator 35, the frequency of which is precisely the desired output of channel frequency. If a frequency difference exists between the output of mixer 32 and the output of crystal oscillator 35, an error voltage is developed by phase detector 34 which, when applied to voltage controlled local oscillator 33, adjusts the frequency thereof to a value necessary to reduce the frequency error to zero. Thus, the output of mixer 32 is automatically synchronized to the frequency and phase of crystal oscillator 35, providing automatic frequency control and a known phase at the output of mixer 32.

Since the frequency and phase of the outputs of mixer 32 and oscillator 35 are identical, the output of oscillator 35 may be phase-shifted and amplitude adjusted in the manner described previously, with respect to decoder 20, to obtain a corrective signal having an amplitude and phase which, when summed with the output of mixer 32 in summer 38, effectively cancels the phase-shifted carrier component and substitutes therefor a carrier component of phase and amplitude which will render intelligible the modulation envelope of the signal at the output of summer 38.

It can therefore be seen that in accordance with the present invention, there is provided a system for encoding or scrambling and subsequently decoding or unscrambling an amplitude modulated signal of the type encountered in television systems which solves the problems encountered heretofore. In the first instance, the present system requires no increase in the normal bandwidth of transmission channels. Secondly, the present system is relatively simple and can be manufactured and sold at an extremely low cost, one which is compatible with wide scale cable television systems.

Finally, in spite of being relatively simple and inexpensive, the present system is highly effective, even with the most modern, sophisticated television receivers.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A system for encoding and decoding an amplitude modulated signal having a carrier component and at least one set of side-bands comprising:
    means for shifting the phase of said carrier component relative to the phase of said side-bands by an amount sufficient to significantly distort the modulation envelope;
    means for transmitting said phase-shifted carrier component and said set of side-bands;
    means for receiving said transmitted signal;
    means for summing said received signal with a corrective signal having the same frequency as said carrier component and having an amplitude and phase which effectively cancels said phase-shifted carrier component and substitutes therefor the original, un-phase-shifted carrier component so as to render intelligible said modulation envelope;
    means for generating a highly stable reference frequency;
    a voltage controlled oscillator;
    means for mixing said received signal with the output of said voltage controlled oscillator to convert the frequency of said carrier component to a frequency approximately equal to that of said reference frequency;
    phase detector means responsive to the outputs of said mixing means and said reference frequency generating means for generating an error voltage proportional to the phase difference therebetween, said error voltage being applied to said voltage controlled oscillator to reduce said error to zero; and
    means for shifting the phase and adjusting the amplitude of said reference signal thereby providing said corrective signal.

2. A system according to claim 1 wherein said summing means adds the output of said mixing means with the output of said phase shifting and amplitude adjusting means.

3. A system for encoding and decoding an amplitude modulated signal having a carrier component and at least one set of side-bands comprising:
    means for shifting the phase of said carrier component relative to the phase of said side bands by an amount sufficient to significantly distort the modulation envelope;
    means for transmitting said phase-shifted carrier component and said set of side-bands;
    means for receiving said transmitted signal;
    means for generating a reference signal having a highly stable frequency;
    means for converting the frequency and phase of said received signal to those of said reference signal;
    means for shifting the phase and adjusting the amplitude of said reference signal to produce a corrective signal having a frequency, amplitude, and phase which restores the original, un-phase-shifted amplitude and phase of said carrier component so as to render intelligible said modulation envelope; and
    means for summing said frequency and phase converted received signal with said corrective signal.

4. A system according to claim 2 wherein said means for converting the frequency and phase of said received signal comprises:
    a voltage controlled oscillator;
    means for mixing said received signal with the output of said voltage controlled oscillator to convert the frequency of said carrier component to a frequency approximately equal to that of said reference signal; and
    phase detector means responsive to the outputs of said mixing means and said reference signal generating means for generating an error voltage proportional to the phase difference therebetween, said error voltage being applied to said voltage controlled oscillator to reduce said error to zero.

* * * * *